United States Patent
Banerjee

(10) Patent No.: US 7,340,017 B1
(45) Date of Patent: Mar. 4, 2008

(54) SYSTEM AND METHOD FOR FINGER MANAGEMENT IN A RAKE RECEIVER

(75) Inventor: Debarag N. Banerjee, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 899 days.

(21) Appl. No.: 10/209,650

(22) Filed: Jul. 30, 2002

(51) Int. Cl.
*H04B 1/00* (2006.01)
(52) U.S. Cl. ........................ 375/348; 375/349
(58) Field of Classification Search ............... 375/148, 375/147, 205, 150, 149, 130, 140, 142, 267, 375/347, 349; 455/421, 456
See application file for complete search history.

(56) References Cited

U.S. PATENT DOCUMENTS

| | | | | |
|---|---|---|---|---|
| 5,471,497 A | * | 11/1995 | Zehavi | 375/142 |
| 5,490,165 A | * | 2/1996 | Blakeney et al. | 370/335 |
| 6,078,611 A | * | 6/2000 | La Rosa et al. | 375/147 |
| 6,249,680 B1 | * | 6/2001 | Wax et al. | 455/456.2 |
| 6,269,075 B1 | * | 7/2001 | Tran | 370/206 |
| 6,320,898 B1 | * | 11/2001 | Newson et al. | 375/144 |
| 6,345,078 B1 | * | 2/2002 | Basso | 375/349 |
| 6,377,614 B1 | * | 4/2002 | Yamashita | 375/149 |
| 6,408,039 B1 | * | 6/2002 | Ito | 375/347 |
| 6,532,222 B1 | * | 3/2003 | Rege et al. | 370/335 |
| 6,618,434 B2 | * | 9/2003 | Heidari-Bateni et al. | 375/148 |
| 6,625,197 B1 | * | 9/2003 | Lundby et al. | 375/130 |
| 6,697,417 B2 | * | 2/2004 | Fernandez-Corbaton et al. | 375/147 |
| 6,731,676 B2 | * | 5/2004 | Rick et al. | 375/148 |
| 7,184,457 B2 | * | 2/2007 | Schmidl et al. | 375/130 |
| 2002/0006158 A1 | * | 1/2002 | Schmidl et al. | 375/150 |
| 2002/0045443 A1 | * | 4/2002 | Hunzinger | 455/421 |
| 2002/0094017 A1 | * | 7/2002 | Wang | 375/144 |
| 2003/0072390 A1 | * | 4/2003 | Corbaton et al. | 375/316 |
| 2003/0142730 A1 | * | 7/2003 | Lin | 375/147 |
| 2004/0057538 A1 | * | 3/2004 | Sathiavageeswaran et al. | 375/350 |

* cited by examiner

*Primary Examiner*—Jean B. Corrielus

(57) ABSTRACT

In a RAKE receiver capable of detecting and combining a plurality of multipath signals, a controller for managing the assignment of the plurality of multipath signals to fingers of the RAKE receiver. The controller determines a phase difference between a selected multipath signal and a first multipath signal assigned to a first finger of the RAKE receiver and does not assign the selected multipath signal to a second finger of the RAKE receiver unless the phase difference is greater than one-half chip. If the phase difference is less that one-half chip, the controller assigns the stronger of the selected multipath signal and the first multipath signal to the first finger of the RAKE receiver. If the finger power falls below a certain threshold, the finger internal states (viz. channel estimate and delay estimate) are maintained while the output of the finger is not processed. If the finger power exceeds the threshold anytime within a specified time interval, the normal activities of the finger are restored. If the power remains lower than the threshold for that time period, the finger is deactivated.

27 Claims, 6 Drawing Sheets

SYSTEM AND METHOD FOR FINGER MANAGEMENT IN A RAKE RECEIVER

TECHNICAL FIELD OF THE INVENTION

The present invention relates generally to wireless receivers and, more particularly, to an apparatus and a related method in a wireless receiver that performs finger management in a RAKE receiver.

BACKGROUND OF THE INVENTION

Business and consumers use a wide array of wireless devices, including cell phones, wireless local area network (LAN) cards, global positioning system (GPS) devices, electronic organizers equipped with wireless modems, and the like. The increased demand for wireless communication devices has created a corresponding demand for technical improvements to such devices. Generally speaking, wireless system designers attempt to minimize the cost of conventional radio receivers while improving the performance of such devices. Performance improvements include, among other things, lower power consumption, greater range, increased receiver sensitivity, lower bit error rates (BER), higher transmission rates, and the like.

Signal fading due to variations in channel characteristics is a major factor limiting the performance of modern mobile wireless communication systems. To compensate for signal fading, many modern code division multiple access (CDMA) networks use diversity techniques to transmit multiple copies of a signal over a channel to a mobile station. In the mobile station, a RAKE receiver uses multiple baseband correlators to individually process several signal multipath components. The correlator outputs are then combined to achieve improved performance.

A RAKE receiver comprises L fingers, where each of the L fingers contains a baseband correlator that processes one of the multipath components. A typical spread spectrum receiver comprises a code phase acquisition circuit that detects multipath components of a transmitted signal and assigns (or allocates) each of the strongest multipath component signals to one of the L RAKE fingers.

However, the channel delays associated with the multipath components are non-stationary. As a result, the multipath components allocated to the RAKE fingers may disappear as the mobile station (e.g., cell phone) moves and the channel delay profile changes. Thus, it is necessary to deassign RAKE fingers once their multipath components are lost, to continuously look for new multipath components, and to assign the new multipath components to deassigned RAKE fingers.

A system for assigning (allocating) and deassigning (deallocating) RAKE fingers is discussed in "Grouped RAKE Finger Management Principle for Wideband CDMA", B. N. Vejlgaard et al., IEEE 2000. However, the apparatus disclosed in the Vejlgaard et al. disclosure only takes finger power into account when making assignment decisions. A very brief fast fading of a multipath component may cause the multipath component to be unnecessarily deassigned from a RAKE receiver finger. When the fade ends after a very brief period, the recovered multipath component is reassigned to the RAKE receiver finger again. Also, the prior art Vejlgaard et al. reference is wasteful of RAKE receiver fingers in that it assigns fingers by groups of three that do not move independently. This increases the number of fingers required and also decreases the resolvability of the RAKE receiver fingers.

Therefore, there is a need in the art for improved RAKE receivers. More particularly, there is a need for improved methods and apparatuses for managing the assignment and deassignment of fingers in a RAKE receiver.

SUMMARY OF THE INVENTION

The present invention comprises provides a system and method for assignment and de-assignment of RAKE receiver fingers using multipath search results and fade measurements. The RAKE fingers demodulate spread spectrum signals in a cellular system downlink. The finger management routine consists of two parts: 1) Search Result Processing (SRP) mode and 2) Finger Fade Management (FFM) mode. Search Result Processing mode decides whether a multipath signal detected by a search routine should be assigned to a RAKE receiver finger. The Finger Fade Management mode monitors the energy on each multipath to detect whether a multipath signal has been lost.

In FFM mode, when the energy on a finger goes below a threshold the finger is no longer combined in the RAKE. If the energy stays below that (or another) threshold for a certain time interval, the finger is deassigned. In SRP mode, if the search routine detects distinct paths that are above a certain threshold, the paths are assigned to unassigned fingers, if there are any available. If there are no unassigned fingers left, the detected path is assigned by replacing the weakest finger, if the weakest finger is weaker than the detected path by a hysteresis factor. The distinctness of the paths is maintained in FFM mode by deassigning paths that are less than half a chip apart.

To address the above-discussed deficiencies of the prior art, it is a primary object of the present invention to provide, for use in a RAKE receiver capable of detecting and combining a plurality of multipath signals, a controller for managing the assignment of the plurality of multipath signals to fingers of the RAKE receiver. According to an advantageous embodiment of the present invention, the controller determines a phase difference between a selected multipath signal and a first multipath signal assigned to a first finger of the RAKE receiver and the controller does not assign the selected multipath signal to a second finger of the RAKE receiver unless the phase difference is greater than one-half chip.

According to one embodiment of the present invention, the controller does not assign the selected multipath signal to the second finger of the RAKE receiver unless the phase difference at least one chip.

According to another embodiment of the present invention, the controller, in response to a determination that the phase difference is less that one-half chip, assigns the stronger of the selected multipath signal and the first multipath signal to the first finger of the RAKE receiver.

According to still another embodiment of the present invention, the controller is further capable of determining if a multipath signal is assigned to each finger of the RAKE receiver and, in response to a determination that no unassigned fingers are available, the controller determines the signal power of all multipath signals assigned to the fingers of the RAKE receiver and identifies a third finger having the weakest multipath signal assigned thereto.

According to yet another embodiment of the present invention, the controller is further capable of determining if a signal power of the selected multipath signal exceeds the weakest multipath signal by at least a hysteresis threshold value.

According to a further embodiment of the present invention, the controller, in response to a determination that the signal power of the selected multipath signal exceeds the weakest multipath signal by at least the hysteresis threshold value, assigns the selected multipath signal to the third finger.

According to a still further embodiment of the present invention, the controller is further capable of determining if the signal power of an assigned multipath signal assigned to a fourth finger of the RAKE receiver is less than a fade threshold value.

According to a yet further embodiment of the present invention, the controller, in response to a determination that the signal power of the assigned multipath signal is less than the fade threshold value, is further capable of determining a time duration during which the assigned multipath signals has been less than the fade threshold value.

In one embodiment of the present invention, the controller, in response to a determination that the time duration during which the assigned multipath signals has been less than the fade threshold value exceeds a maximum fade duration value, deassigns the assigned multipath signal from the fourth finger.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. In particular, a controller may comprise a data processor and an associated memory that execute one or more functions associated with the present invention. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged mobile station RAKE receiver.

Figure 1:
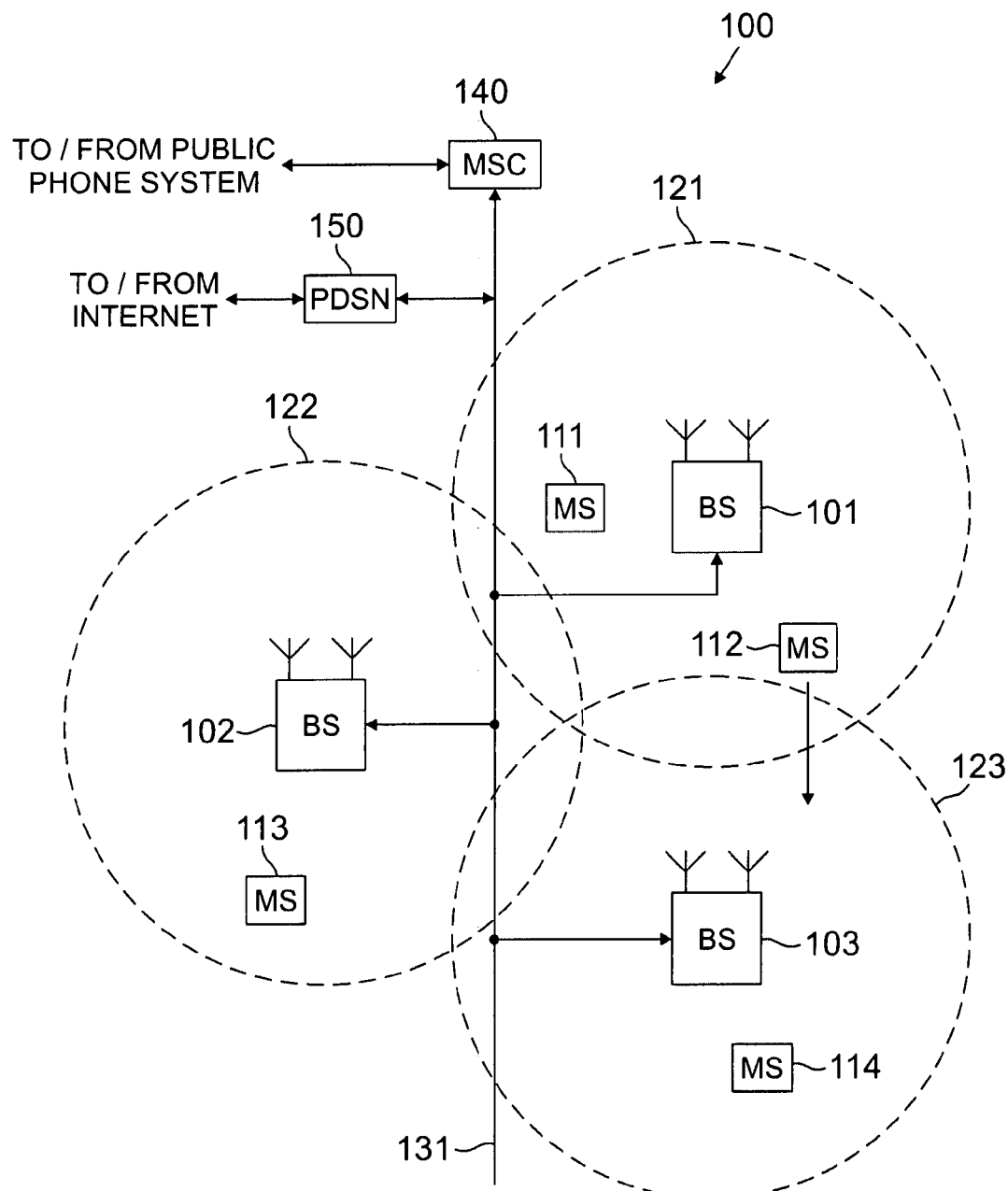
FIG. 1 illustrates an exemplary wireless network in which mobile station RAKE receivers using channel estimation techniques according to the principles of the invention may be used.

FIG. 1 illustrates exemplary wireless network 100, in which mobile station RAKE receivers using channel estimation techniques according to the principles of the present invention may be used. Wireless network 100 comprises a plurality of cell sites 121-123, each containing a base station (BS), such as BS 101, BS 102, or BS 103. Base stations 101-103 communicate with a plurality of mobile stations (MS) 111-114 over, for example, code division multiple access (CDMA) channels. Mobile stations 111-114 may be any suitable wireless devices, including conventional cellular radiotelephones, PCS handset devices, personal digital assistants, portable computers, or metering devices. The present invention is not limited to mobile devices. Other types of access terminals, including fixed wireless terminals, may be used. However, for the sake of simplicity, only mobile stations are shown and discussed hereafter.

Dotted lines show the approximate boundaries of the cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, cell sites 121-123 are comprised of a plurality of sectors (not shown), each sector being illuminated by a directional antenna coupled to the base station. The embodiment of FIG. 1 illustrates the base station in the center of the cell. Alternate embodiments position the directional antennas in corners of the sectors. The system of the present invention is not limited to any particular cell site configuration.

In one embodiment of the present invention, BS 101, BS 102, and BS 103 comprise a base station controller (BSC) and one or more base transceiver subsystem(s) (BTS). Base station controllers and base transceiver subsystems are well known to those skilled in the art. A base station controller is a device that manages wireless communications resources, including the base transceiver stations, for specified cells within a wireless communications network. A base transceiver subsystem comprises the RF transceivers, antennas, and other electrical equipment located in each cell site.

BS 101, BS 102 and BS 103 transfer voice and data signals between each other and the public switched telephone network (PSTN) (not shown) and the Internet via communication line 131, mobile switching center (MSC) 140, and packet data serving node (PDSN) 150. MSC 140 is a switching device that provides services and coordination between the subscribers in a wireless network and external networks, such as the PSTN or Internet.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur. In an alternate embodiment, any of the mobile stations may be in communication with a multiplicity of base stations, at least including the base station belonging to the cell it is located in. This is known as soft handoff in the art.

The base stations may transmit from a single antenna or from two antennas. If two antennas are used, the base stations may use transmit diversity (e.g., space-time transmit diversity (STTD)) by coding data in a space-time code and transmitting the pilot symbols in an orthogonal pattern, such as the pattern illustrated in FIG. 2.

Figure 2:
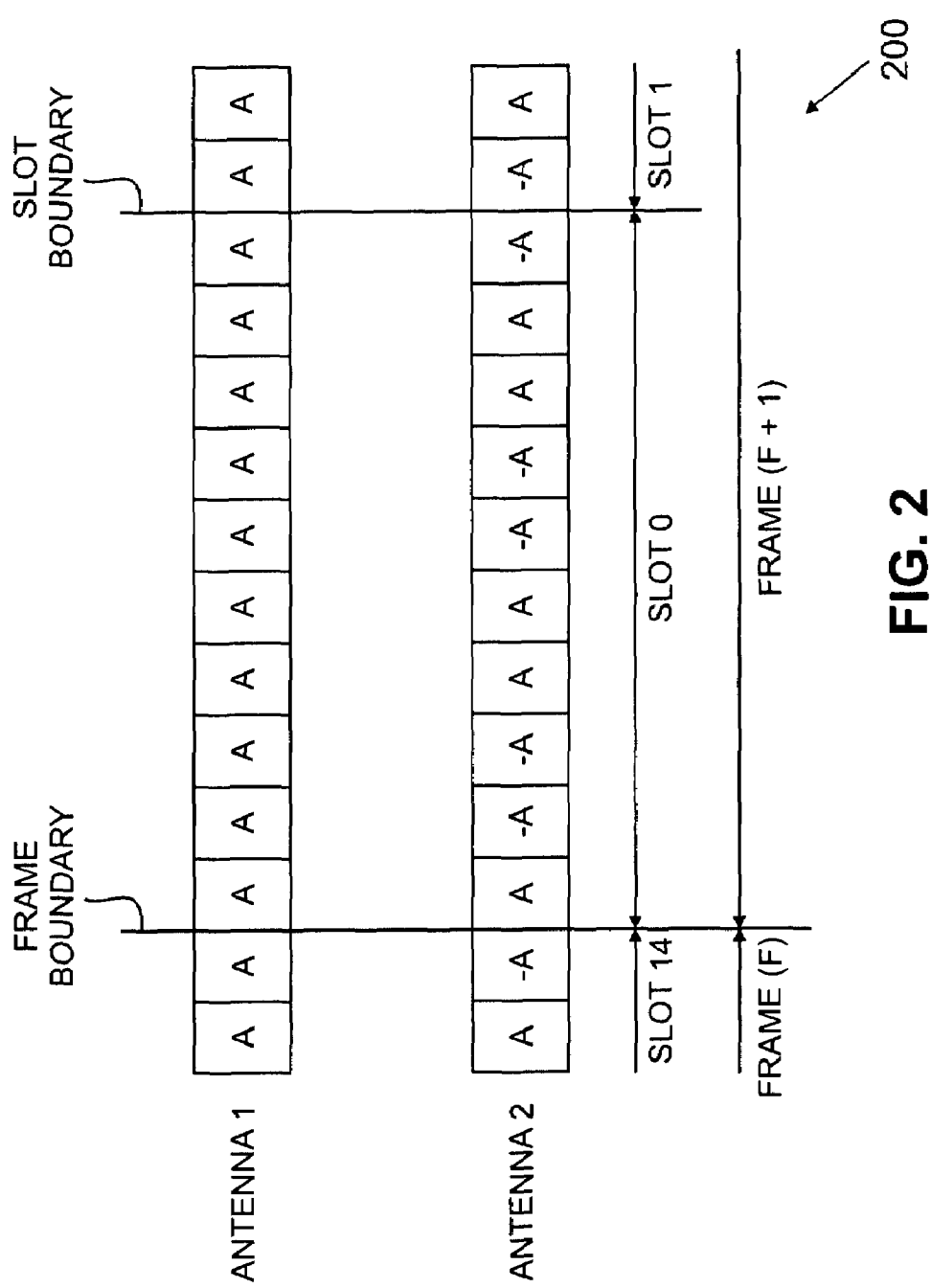
FIG. 2 is a timing diagram illustrating the modulation pattern for the common pilot channel (CPICH) signals in the wireless network in FIG. 1 according to an exemplary embodiment of the present invention.

FIG. 2 illustrates timing diagram 200, which depicts the modulation pattern for the common pilot channel (CPICH) signals in wireless network 100 according to an exemplary embodiment of the present invention. In FIG. 1, each of BS 101-BS 103 has two antennas that may be used to communicate with MS 111-MS 114. Each of base stations 101-103 may use a single antenna to communicate in a non-transmission diversity (non-TD) mode with the mobile stations. However, in an advantageous embodiment of the present invention, each of base stations 101-103 may combat the effects of multipath fading by transmitting from two antennas in a space-time transmit diversity (STTD) mode.

In an exemplary embodiment, wireless network 100 is compatible with the $3^{rd}$ Generation Partnership Project (3GPP) standard. In a 3GPP system, during non-TD mode, a common pilot channel (CPICH) signal is transmitted as a quadrature signal from a single antenna using the pattern shown for Antenna 1 in FIG. 2, where A=1+j. During STTD mode, a first common pilot channel (CPICH) signal is transmitted as a first quadrature signal from a first antenna using the pattern shown for Antenna 1 in FIG. 2, and a second common pilot channel (CPICH) signal is transmitted as a second quadrature signal from a second antenna using the pattern shown for Antenna 2 in FIG. 2.

Figure 3:
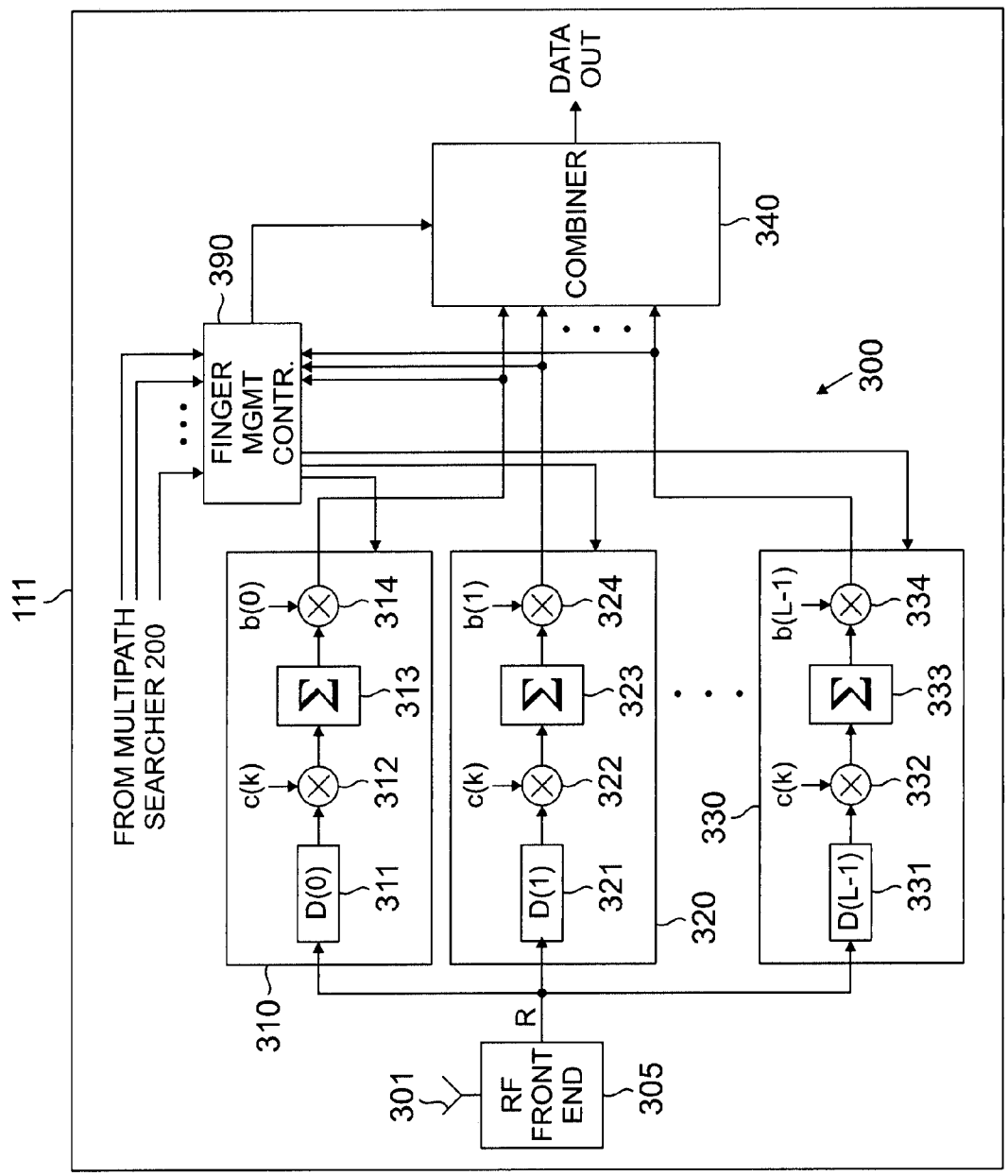
FIG. 3 is a high-level block diagram of a RAKE receiver in an exemplary mobile station according to one embodiment of the present invention.

FIG. 3 is a high-level block diagram of RAKE receiver 300 in exemplary mobile station 111 according to one embodiment of the present invention. RAKE receiver comprises antenna 301, radio frequency (RF) front-end block 305, L fingers, including exemplary fingers 310, 320 and 330, combiner 340, and finger management controller 390. Finger 310 comprises delay element 311, multiplier 312, summer 313 and multiplier 314. Finger 320 comprises delay element 321, multiplier 322, summer 323 and multiplier 324. Finger 330 comprises delay element 331, multiplier 332, summer 333 and multiplier 334.

RF front-end block 305 downconverts the incoming RF signals received from antenna 301 and produces a baseband or intermediate frequency signal, which is sampled and quantized by an analog-to-digital converter (ADC) to produce a sequence of digital values, the signal R. The signal R is supplied as the input to each of the L fingers. In each of the L fingers, there is a correlator formed by a multiplier and a summer. For example, in finger 310, the correlator is formed by multiplier 312 and summer 313, in finger 320, the correlator is formed by multiplier 322 and summer 323, and in finger 330, the correlator is formed by multiplier 332 and summer 333.

In each finger, the signal R is initially delayed by some time delay $D(n)$ by the delay elements. The output of each delay element is the input of the correlator for that finger. Thus, the correlators are synchronized to each of the L strongest multipath components by delaying the received signal R in each finger by an appropriate amount of time $D(n)$. The delayed samples of the received signal R are then correlated with the chip pattern, $c(k)$, to produce a correlated output. The correlated outputs of the correlators are then weighted by coefficients $b(n)$ by the multipliers 314, 324, and 334. Combiner 340 combines the weighted outputs and the resulting DATA OUT signal is the final baseband signal.

The weighting coefficients $b(n)$ in each of the L fingers of RAKE receiver 300 are calculated by a channel estimation filter that uses the pilot channel signals transmitted by base stations 101, 102, and 103 and that optimizes the weighting coefficients $b(n)$ over a range of Doppler frequencies using the average MMSE criterion. In an exemplary embodiment, a digital signal processor (DSP) performs channel estimation.

Figure 6:
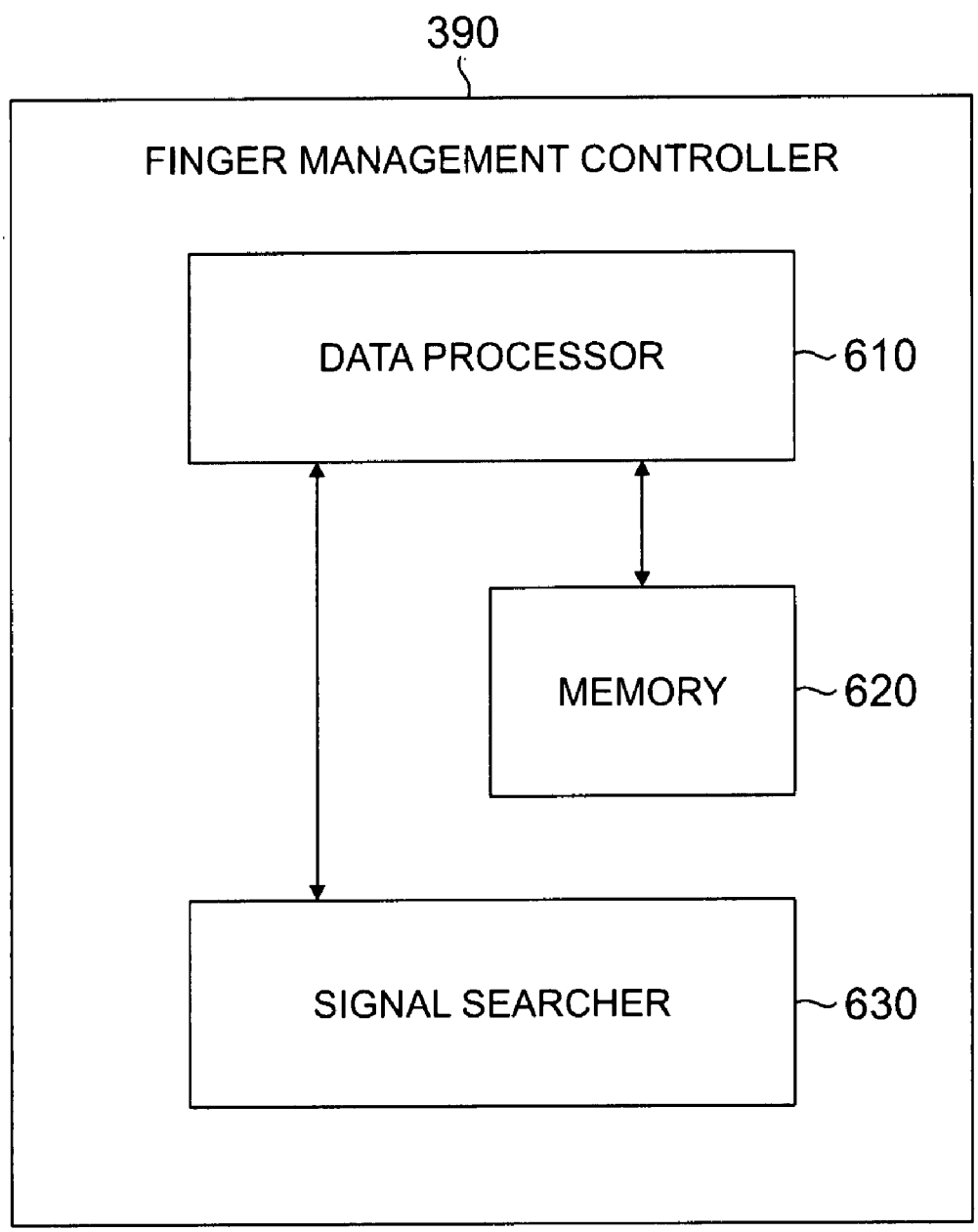
FIG. 6 is a diagram illustrating an exemplary embodiment of a finger management controller of the present invention.

According to the principles of the present invention RAKE receiver 300 comprises finger management controller 390, which is used to assign (allocate), deassign (deallocate), activate (combine the output of the finger with the outputs of the other fingers) and deactivate (not combine the output of the finger with the outputs of the other fingers) each of the L fingers to the strongest multipath component signals. In an advantageous embodiment, as shown in FIG. 6, finger management controller 390 may comprise a data processor 610 and an associated memory 620 that execute one or more finger management functions associated with the present invention. In particular, finger management controller 390 may comprise a portion of the control software executed by a digital signal processor (DSP). Advantageously, finger management controller 390 may include or be coupled to a signal searcher 630 that can detect and measure the strength of multipath signals received from base stations.

Finger management controller 390 performs two primary functions: 1) Search Result Processing (SRP) mode operations and 2) Finger Fade Management (FFM) mode operations. In SRP mode, finger management controller 390 decides whether a multipath signal detected by a search routine should be assigned to a RAKE receiver finger. In FFM mode, finger management controller 390 monitors the energy of the multipath signal on each assigned finger to detect whether a multipath signal has been lost.

In FFM mode, when the energy on a finger goes below a preset threshold value, finger management controller 390 blocks combiner 340 from combining that finger into the DATA OUT signal (i.e. deactivates that finger). If the energy stays below that (or another) threshold value for a certain time interval, the finger is deassigned. When a finger is deassigned, finger management controller 390 may remove power to the entire finger, thereby reducing power consumption.

In SRP mode, if finger management controller 390 determines that certain distinct paths are above a certain threshold, those paths are assigned to unassigned fingers, if any are available. If there are no unassigned fingers left, finger management controller 390 assigns the detected path by replacing the weakest finger, if the weakest finger is weaker than the detected path by a hysteresis factor. According to an exemplary embodiment of the present invention, finger management controller 390 maintains the distinctness of the paths in FFM mode by deassigning paths that are less than half a chip apart.

In FIG. 3, finger management controller 390 monitors the output of each finger by receiving and monitoring the output of the final multiplier in each finger (e.g., multipliers 314, 324 and 334). However, it should be understood that this is by way of illustration only and should not be construed so as to limit the scope of the present invention. In alternate embodiments, finger management controller 390 may determine the signal strength in each finger by monitoring, for example, the unweighted output of the summer in each finger (e.g., summers 313, 323 and 333).

Finger Fade Management (FFM) Mode

FFM mode is executed every frame. The important parameters used by finger management controller 390 in FFM mode are:
1) Fade Threshold;
2) Maximum Fade Duration;
3) Lock Threshold; and
4) Hysteresis.

The following description of the present invention sets forth particular values for selected parameters and other criteria. It should be understood that the particular values chosen are by way of example only and should not be construed so as to limit the scope of the present invention. Those skilled in the art will readily understand how to modify the particular values chosen and set forth herein in order to adapt the present invention to other particular environments or different configurations.

Fade Threshold

The choice of the Fade Threshold and Maximum Fade Duration parameter values are interrelated. For the purpose of fade determination, the Fade Threshold value needs to be chosen such that the probability of triggering the fade timer given that the mobile is in a temporary fast fade (as opposed to a more permanent change in propagation condition) is limited. This probability is referred to herein as the false loss alarm probability, $P_f$. For Rayleigh fading, the probability of the signal energy going below the Fade Threshold signal level, R, when the local average is $\Omega$ is:

$$P_f = Pr[E_c < R | E\{E_c\} = \Omega] = 1 - e^{-R/\Omega} \quad [1]$$

Choosing this false alarm probability, $P_f$, to be 0.005 (arbitrarily) yields:

$$R/\Omega = -23 \text{ dB}.$$

The P-CPICH channel typically has a value of Ec/Ior of about −7 dB, as coded for default parameters. This roughly corresponds to an Ec/Io threshold of −30 dB for the Fade Threshold level, R (assuming that out-of-cell interference and ISI had been minimal). Thus, the Fade Threshold parameter value for this false alarm probability is set to be −30 dB.

Maximum Fade Duration

Given Fade Threshold, R, the average fade duration for Rayleigh fading may be obtained as:

$$\bar{t} = \frac{e^{R/\Omega} - 1}{f_m \sqrt{2\pi(R/\Omega)}} \quad [2]$$

where,
R=Fade Threshold level;
$\Omega$=average energy; and
$f_m$=maximum Doppler frequency.

The fade counter is designed to check whether the decrease in the signal level below the Fade Threshold is due to a fast fade or not. A test for such a hypotheses may be made by setting the value of Maximum Fade Duration equal to the average fade duration for a threshold R=Fade Threshold. Since this test needs to work for all typical mobile velocities, the slowest among the typical channel cases needs to be considered. This corresponds to a mobile speed of about 3 kmph, and hence a Doppler of about 6 Hz for a carrier frequency of 2 GHz.

Using Equation 2 above, the average fade duration for −23 dB is about 4.72 ms, which may be used as the value of Maximum Fade Duration when the Fade Threshold level is set to −30 dB.

For other values of false fade alarm probabilities, $P_f$, the following may be used as parameter values:

| $P_f$ | FT (dB) | MFD (ms) |
|---|---|---|
| 0.005 | −30.0 | 4.72 |
| 0.01 | −27.0 | 6.70 |
| 0.02 | −23.9 | 9.55 |
| 0.05 | −19.9 | 15.45 |
| 0.1 | −16.8 | 22.76 |
| 0.2 | −13.5 | 35.19 |
| 0.5 | −8.6 | 79.86 |

Lock Threshold

The Lock Threshold parameter needs to be chosen such that when the signal from a particular multipath signal falls below that level, its inclusion does not improve the probability of error by a significant amount. This can be accomplished by considering the Chernoff bound on the probability of error given by:

$$P_e < \prod_{l=1}^{L} \frac{e^{-\alpha_l^2 N E_c / I_o}}{1 - (N/G_p N_p)} \quad [3]$$

where,
$\alpha_l^2$ $E_c/I_o$=Ec/Io of the lth multipath;
N=Spreading factor;
$G_p$=Pilog gain; and
$N_p$=Integration time for channel estimation.

If wireless network 100 conform to the $3^{rd}$ Generation Partnership Project (3GPP) standard, it is assumed that N=256 and $G_p$=7 dB are typical values. In RAKE receiver 300, the pilot channel signal is integrated over 256 chips and filtered using a single pole IIR filter with forgetting factor of around 0.9. This yields an effective $N_p$=2560.

Using these parameters in Equation 3, the probability of error actually starts increasing when the multipath SIR value, $\alpha_l^2$ $E_c/I_0$, is below −41 dB. Thus, the Lock Threshold value should be set above this limit. Although the factor becomes less than 1 at −41 dB, it starts to significantly improve the link quality only when the SIR is below −30 dB. As this is also the recommended level for the Fade Threshold value, the same level of −30 dB is recommended for the Lock Threshold as well. In practice, having the same level for the Lock Threshold and the Fade Threshold makes the computation less by reducing one step in the algorithm.

Hysteresis

The Hysteresis value is the minimum difference in power (in dB) between an existing multipath and the detected multipath that must be satisfied in order to perform a finger reassignment. There are two sources of error that the hysteresis should guard against: 1) the possibility of a temporary fade in the existing path and 2) an error in computing the power of the searched multipath.

Let the Hysteresis value for guarding against temporary fade be $H_1$. Then, the probability of false change (i.e., the probability that the average energy (Q) of the old multipath is less than the energy of the new multipath given that the instantaneous energy is less than $\Omega/H_1$) is (for Rayleigh fading):

$$P_f \leq Pr[E_o < \Omega/H_1 | E\{E_o\} = \Omega] = 1 - e^{-\Omega/H_1\Omega} = 1 - e^{-1/H_1} \quad [4]$$

In order to have $P_e < 0.5$, we need $H_1 = 1.44 = 1.6$ dB.

The other source of error is the error involved in the estimation of the power. In an exemplary embodiment of RAKE receiver 300, the power estimation in the filter is performed over 1024 chips of coherent integration followed by 25 samples of non-coherent integration. Since the mean of the I and Q components are non-zero, the power estimate is Chi-square ($\chi^2$) distributed with degree n−1, where n=25, as follows:

$$\frac{(n-1)\hat{E}}{E} \sim \chi^2(n-1) \quad [5]$$

So, for a given one-sided confidence level $$Pr\left[E > \frac{(n-1)\hat{E}}{\chi^2_{1-\delta}(n-1)}\right] = \delta \quad [6]$$

the noise threshold may be set to $$H_2 = \frac{\chi^2_{1-\delta}(n-1)}{(n-1)}. \quad [7]$$

For $\delta = 0.9$ and n=25, this yields $H_2 = 1.38 = 1.4$ dB.

Combining the noise and the fading thresholds yields a total hysteresis threshold of:

$$H = H_1 + H_2 = 3 \text{ dB}$$

Power Scaling Factor

The finger power estimate needs to be scaled up by a scaling factor in order to make direct comparisons with the searcher power estimates. In both the searcher and the finger, the coherent integration is long enough such that the noise component in the power estimate can be neglected (otherwise the scaling factor depend on the signal-to-noise ratio (SNR)). The power estimate in either case is approximately:

$$\hat{E} = N^2 E_c + NI_0 \approx N^2 E_c \quad [8]$$

Hence, the scaling factor should be $$\frac{\hat{E}_c |_{Searcher}}{\hat{E}_c |_{RAKE}} = \frac{N^2_{Searcher}}{N^2_{RAKE}} = \left(\frac{2048}{256}\right)^2 = 18 \text{ dB}. \quad [9]$$

Note that when the searcher power is compared to the finger powers, both the scaling and the hysteresis need to be considered. Hence, a total gain of 21 dB needs to be applied to the finger power estimate.

Search Result Processing (SRP)

Finger management controller 390 executes SRP mode once every search interval (i.e., every time a search is completed over the entire window of all base station in the active set, modulo a frame). In SRP mode, the important parameters/heuristics used by finger management controller 390 are:

1) Combining Threshold; and
2) Minimum Phase.

Combining Threshold

If the energy of a searched multipath is greater than the Combining Threshold, the multipath is considered for finger assignment, subject to subsequent constraints (e.g., finger availability). This is the same as detection of a multipath signal. Hence, this threshold should be equal to the detection threshold in the multipath search circuitry.

Minimum Phase

The Minimum Phase gives the minimum separation in phase that is allowed between any two finger assignments. Two different techniques are considered:

1) Minimum Phase>½ chip—In this scenario, finger management controller 390 only considers paths that are more than ½ chip apart. If two paths are less than or equal to ½ chip apart, the stronger one is assigned. In an advantageous embodiment of the present invention, finger management controller may use a chip spacing of at least one chip. The advantage of this method is that finger assignments are more robust as the unresolvable side lobes typically get eliminated.

2) Minimum Phase=0 chips—In this scenario, finger management controller 390 assigns all the paths that are detected to fingers regardless of the separation between paths. If finger management controller 390 employs a delay-locked loop (DLL) that brings the two paths together, then the weaker one is dropped. The problem with this method is that a typical DLL only move the path by maximum of ⅛ chip in each frame. Thus, it takes at least 4 frames in order to drop any spurious multipaths. This leads to noise enhancements for short periods of time as well as excess finger activity (hence, excess power). Also, since the number of fingers is limited, if all fingers get assigned to actual multipaths and their sidelobes, other weaker multipaths cannot be accommodated until the DLLs of finger management controller 390 resolve the ambiguity.

Figure 4:
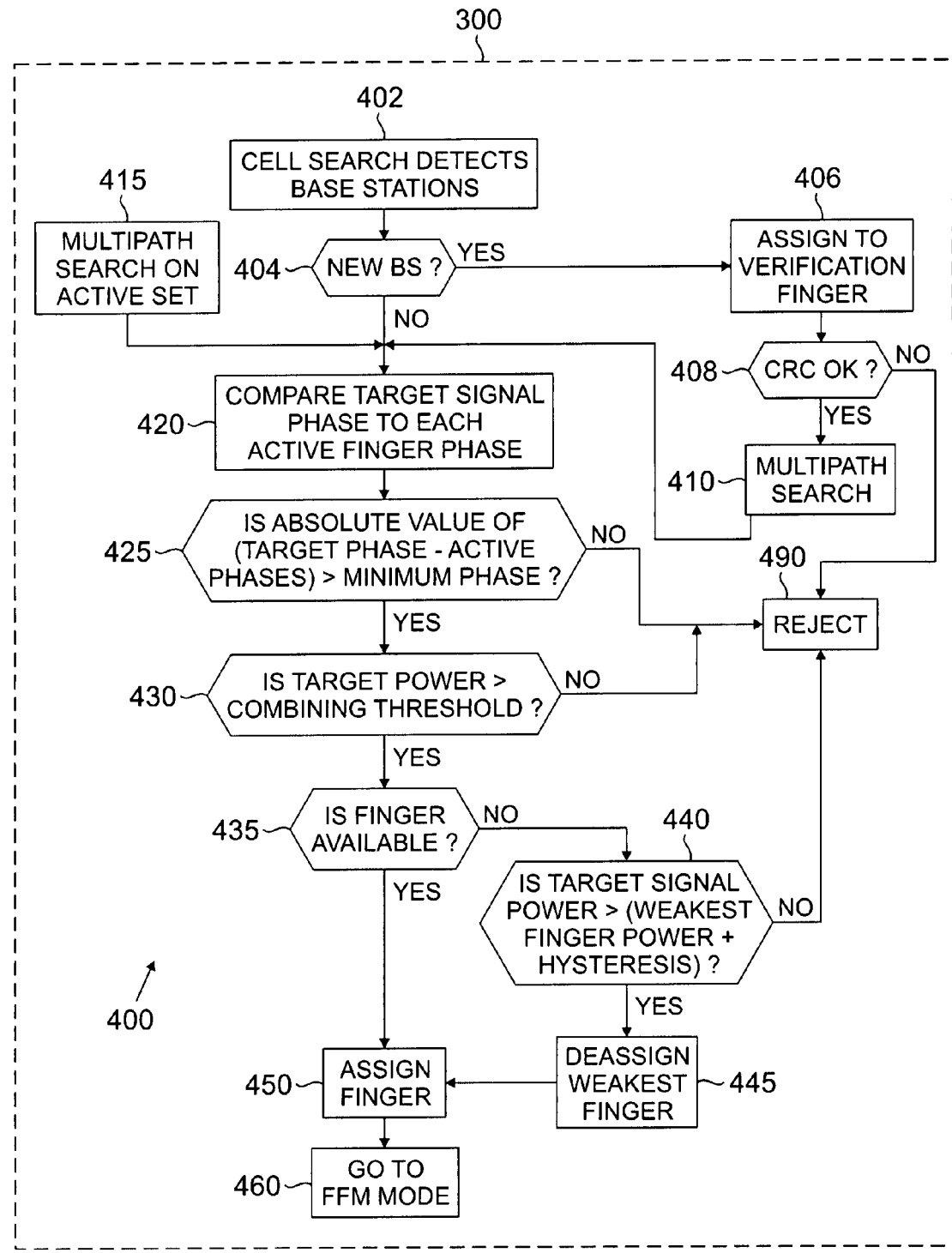
FIG. 4 is a flow diagram illustrating the operation of Search Result Processing (SRP) mode according to an exemplary embodiment of the present invention.

FIG. 4 illustrates flow diagram 400, which depicts the operation of Search Result Processing (SRP) mode according to an exemplary embodiment of the present invention. Initially, the mobile station performs a cell search and detects a new base station (BS) signal (process step 402). Next, the mobile station determines if the detected base station signal is coming from a new base station (process step 404). If it is a new base station (i.e., Yes), the new base station signal is assigned to a verification finger (process step 406) and the BCH CRC value is checked.

If the CRC value is invalid, the new base station signal is rejected (process step 490). If the CRC value is valid, finger management controller 390 conducts a multipath search (process step 410) and compares the phase of the new detected signal (referred to hereafter as the "target signal") to the phases of the active finger in RAKE receiver 300 (process step 420). Alternatively, finger management controller 390 may enter process step 420 when performing a multipath search on the active set of fingers (process step 415). In this case, the signal from each finger is treated as if it is a new detected signal and also is referred to hereafter as the "target signal" in step 420 and subsequent steps.

Finger management controller 390 determines if the difference between the phase of the target signal and the phase of each one of the active fingers is greater than the Minimum Phase value (process step 425). If not, the target signal is rejected (process step 490). If the phase difference is greater that the Minimum Phase value, finger management controller 390 determines if the power of the target signal is greater than the Combining Threshold value (process step 430). If not, the target signal is rejected (process step 490).

If the target signal power is greater than the Combining Threshold value, finger management controller 390 determines if a finger is available (process step 435). If a finger is available, finger management controller 390 assigns the target signal to an available finger (process step 450) and enters finger fade management mode (process step 460). If no finger is available, finger management controller 390 determines if the power of the target signal is greater than the sum of the power of the weakest signal on an active finger plus and the Hysteresis value.

If the target signal power is not greater than the sum of the weakest signal power plus the Hysteresis value, finger management controller 390 rejects the target signal (process step 490). If the target signal power is greater than this sum, finger management controller deassigns the weakest signal (process step 445), assigns the target signal to the newly available finger (process step 450) and enters finger fade management mode (process step 460).

Figure 5:
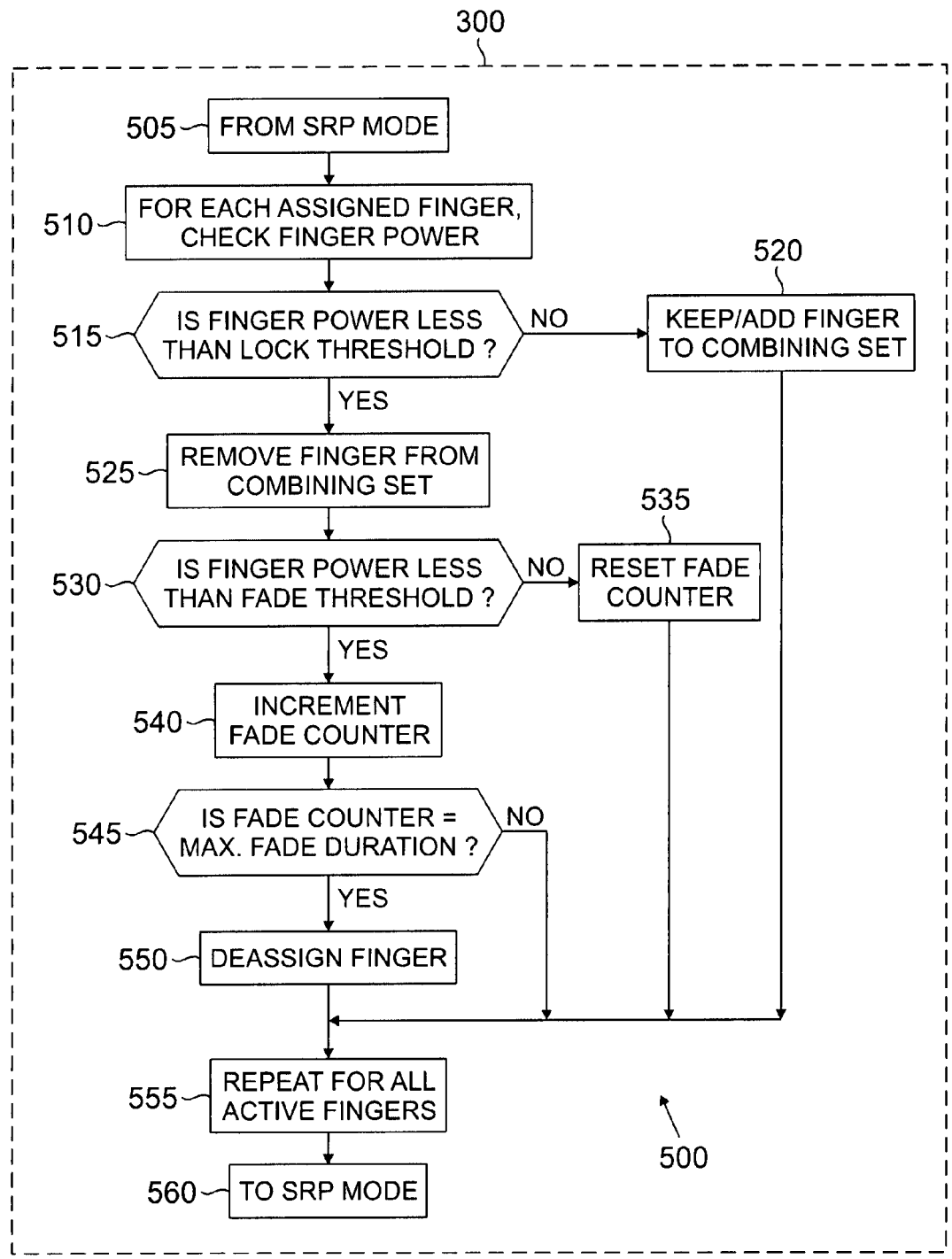
FIG. 5 is a flow diagram illustrating the operation of Finger Fade Management (FFM) mode according to an exemplary embodiment of the present invention.

FIG. 5 illustrates flow diagram 500, which depicts the operation of Finger Fade Management (FFM) mode according to an exemplary embodiment of the present invention. FFM mode begins when finger management controller 390 exits Search Result Processing (SRP) mode (process step 505). Initially, finger management controller 390 checks the power of the received signal in each active finger (process step 510). It is notes that process step 510 and the remaining process steps in flow diagram 500 are repeated for each active finger.

For each finger, finger management controller 390 determines if the finger power is less than the Lock Threshold value (process step 515). If not, finger management controller 390 either keeps (i.e., for existing finger) the subject finger in, or adds (i.e., for new finger) the subject finger to, the combining set of active fingers combined by combiner 340. Finger management controller 390 then proceeds to the next subject finger until all fingers are done (process step 555). If the finger power is less than the Lock Threshold value, finger management controller 390 removes the subject finger from the combining set of active fingers combined by combiner 340 (process step 525).

Next, finger management controller 390 determines if the finger power is less than the Fade Threshold value (process step 530). If not, finger management controller 390 resets the Fade Counter (process step 535) and activates the finger if it was deactivated. Finger management controller 390 then proceeds to the next subject finger until all fingers are done (process step 555). However, if the finger power is less than the Fade value, finger management controller 390 increments the Fade Counter value (process step 540) and deactivates the finger.

In this context, deactivation of a finger implies that the finger continues to perform all signal processing functions (including, for example, channel estimation, delay adjustment, and the like) that are required to maintain the state of the finger, except that the finger output will not be combined (and optionally will not be used in automatic frequency correction). Activation implies that all the normal functions of a RAKE finger (including combining of its output and use in AFC) are restored.

It is noted that the channel gain and delay elements stay up-to-date when a finger is activated following deactivation, thereby ensuring better bit error performance. When a finger is freshly assigned, however, these parameters need to be estimated from scratch, thereby degrading performance.

Next, finger management controller 390 determines if the Fade Counter value is equal to the Maximum Fade Duration value (process step 545). If not, finger management controller 390 proceeds to the next subject finger until all fingers are done (process step 555). However, if the Fade Counter value is equal to the Maximum Fade Duration value, finger management controller 390 deassigns the subject finger (process step 550).

Finger management controller 390 repeats the Finger Fade Management loop until all active fingers are done (process step 555). When all active fingers are done, finger management controller 390 returns to SRP mode (process step 560).

The prior art disclosed in the Vejlgaard et al. reference only takes searcher and finger power into account when making assignment decisions. The present invention uses searched power, finger power measurements, as well as a fade timer in making finger assignment and deassignment decisions. In addition, by activating and deactivating the finger, the present invention enables faster response to fades and has better bit error performance. Also, the prior art is wasteful of RAKE receiver fingers in that it assigns fingers by groups of three that do not move independently. The present invention minimizes the number of fingers required and also preserves the resolvability of the fingers.

Although the present invention has been described with several embodiments, various changes and modifications may be suggested to one skilled in the art. It is intended that the present invention encompass such changes and modifications as fall within the scope of the appended claims.

What is claimed is:

1. A controller in a RAKE receiver that detects and combines a plurality of multipath signals, said controller comprising:
   a data processor and a memory associated with said data processor
   wherein said data processor of said controller executes computer software instructions contained within said memory to cause said controller to manage an assignment of said plurality of multipath signals to fingers of said RAKE receiver, wherein said controller determines a phase difference between a selected multipath signal and a first multipath signal assigned to a first finger of said RAKE receiver, and wherein said controller does not assign said selected multipath signal to a second finger of said RAKE receiver unless said phase difference is greater than one-half chip.

2. The controller as set forth in claim 1 wherein said controller does not assign said selected multipath signal to said second finger of said RAKE receiver unless said phase difference is at least one chip.

3. The controller as set forth in claim 1 wherein said controller, in response to a determination that said phase difference is less than one-half chip, assigns a stronger of said selected multipath signal and said first multipath signal to said first finger of said RAKE receiver.

4. The controller as set forth in claim 1 wherein said controller determines if a multipath signal is assigned to each finger of said RAKE receiver and, in response to a determination that no unassigned fingers are available, said controller determines a signal power of each of the multipath signals assigned to said fingers of said RAKE receiver and identifies a third finger having a weakest multipath signal assigned thereto.

5. The controller as set forth in claim 4 wherein said controller determines if a signal power of said selected multipath signal exceeds the signal power of said weakest multipath signal by at least a hysteresis threshold value.

6. The controller as set forth in claim 5 wherein said controller, in response to a determination that said signal power of said selected multipath signal exceeds the signal power of said weakest multipath signal by at least said hysteresis threshold value, assigns said selected multipath signal to said third finger.

7. The controller as set forth in claim 1 wherein said controller determines if a signal power of an assigned multipath signal assigned to a third finger of said RAKE receiver is less than a fade threshold value.

8. The controller as set forth in claim 7 wherein said controller, in response to a determination that said signal power of said assigned multipath signal is less than said fade threshold value, determines a time duration during which said assigned multipath signal has been less than said fade threshold value.

9. The controller as set forth in claim 8 wherein said controller, in response to a determination that said time duration exceeds a maximum fade duration value, deassigns said assigned multipath signal from said third finger.

10. A RAKE receiver comprising:
a radio frequency (RF) front-end that receives an incoming RF signal and down-converts and digitizes said RF signal to a baseband or intermediate signal comprising a sequence of digital samples;
a plurality of fingers, each of said fingers configured to process one of a plurality of multipath signals associated with said sequence of digital samples to thereby produce a correlated output; and
a controller for managing an assignment of said plurality of multipath signals to said fingers of said RAKE receiver, wherein said controller determines a phase difference between a selected multipath signal and a first multipath signal assigned to a first finger of said RAKE receiver, and wherein said controller does not assign said selected multipath signal to a second finger of said RAKE receiver unless said phase difference is greater than one-half chip.

11. The RAKE receiver as set forth in claim 10 wherein said controller does not assign said selected multipath signal to said second finger of said RAKE receiver unless said phase difference is at least one chip.

12. The RAKE receiver as set forth in claim 10 wherein said controller, in response to a determination that said phase difference is less than one-half chip, assigns a stronger of said selected multipath signal and said first multipath signal to said first finger of said RAKE receiver.

13. The RAKE receiver as set forth in claim 10 wherein said controller determines if a multipath signal is assigned to each finger of said RAKE receiver and, in response to a determination that no unassigned fingers are available, said controller determines a signal power of each of the multipath signals assigned to said fingers of said RAKE receiver and identifies a third finger having a weakest multipath signal assigned thereto.

14. The RAKE receiver as set forth in claim 13 wherein said controller determines if a signal power of said selected multipath signal exceeds the signal power of said weakest multipath signal by at least a hysteresis threshold value.

15. The RAKE receiver as set forth in claim 14 wherein said controller, in response to a determination that said signal power of said selected multipath signal exceeds the signal power of said weakest multipath signal by at least said hysteresis threshold value, assigns said selected multipath signal to said third finger.

16. The RAKE receiver as set forth in claim 10 wherein said controller determines if a signal power of an assigned multipath signal assigned to a third finger of said RAKE receiver is less than a fade threshold value.

17. The RAKE receiver as set forth in claim 16 wherein said controller, in response to a determination that said signal power of said assigned multipath signal is less than said fade threshold value, determines a time duration during which said assigned multipath signal has been less than said fade threshold value.

18. The RAKE receiver as set forth in claim 17 wherein said controller, in response to a determination that said time duration exceeds a maximum fade duration value, deassigns said assigned multipath signal from said third finger.

19. For a RAKE receiver that detects and combines a plurality of multipath signals, a method for managing an assignment of the plurality of multipath signals to fingers of the RAKE receiver, the method comprising the steps of:
determining a phase difference between a selected multipath signal and a first multipath signal assigned to a first finger of the RAKE receiver;
determining if the phase difference is greater than one-half chip; and
in response to a determination that the phase difference is not greater than one-half chip, not assigning the selected multipath signal to a second finger of the RAKE receiver.

20. The method as set forth in claim 19 further comprising the step of not assigning the selected multipath signal to the second finger of the RAKE receiver unless the phase difference is at least one chip.

21. The method as set forth in claim 19 further comprising the step, in response to a determination that the phase difference is less than one-half chip, of assigning a stronger of the selected multipath signal and the first multipath signal to the first finger of the RAKE receiver.

22. The method as set forth in claim 19 further comprising the steps of:
determining if a multipath signal is assigned to each finger of the RAKE receiver;
in response to a determination that no unassigned fingers are available, determining a signal power of each of the multipath signals assigned to the fingers of the RAKE receiver; and
identifying a third finger having a weakest multipath signal assigned thereto.

23. The method as set forth in claim 22 further comprising the step of determining if a signal power of the selected multipath signal exceeds the signal power of the weakest multipath signal by at least a hysteresis threshold value.

24. The method as set forth in claim 23 further comprising the step, in response to a determination that the signal power of the selected multipath signal exceeds the signal power of the weakest multipath signal by at least the hysteresis threshold value, of assigning the selected multipath signal to the third finger.

25. The method as set forth in claim 19 further comprising the step of determining if a signal power of an assigned multipath signal assigned to a third finger of the RAKE receiver is less than a fade threshold value.

26. The method as set forth in claim 25 further comprising the step, in response to a determination that the signal power of the assigned multipath signal is less than the fade threshold value, of determining a time duration during which the assigned multipath signal has been less than the fade threshold value.

27. The method as set forth in claim 26 further comprising the step, in response to a determination that the time duration exceeds a maximum fade duration value, of deassigning the assigned multipath signal from the third finger.

* * * * *